(12) United States Patent
Scantlebury

(10) Patent No.: US 8,968,849 B2
(45) Date of Patent: Mar. 3, 2015

(54) POLYESTER COMPOSITION FOR IMPROVED STRESS CRACK RESISTANCE IN POLYESTER ARTICLES

(75) Inventor: Geoffrey R. Scantlebury, Charlotte, NC (US)

(73) Assignee: Invista North America S.a.r.l., Wilmington, DE (US)

( * ) Notice: Subject to any disclaimer, the term of this patent is extended or adjusted under 35 U.S.C. 154(b) by 42 days.

(21) Appl. No.: 13/521,817

(22) PCT Filed: Jan. 18, 2011

(86) PCT No.: PCT/US2011/021540
§ 371 (c)(1),
(2), (4) Date: Jul. 12, 2012

(87) PCT Pub. No.: WO2011/088455
PCT Pub. Date: Jul. 21, 2011

(65) Prior Publication Data
US 2013/0004693 A1    Jan. 3, 2013

Related U.S. Application Data

(60) Provisional application No. 61/295,798, filed on Jan. 18, 2010.

(51) Int. Cl.
*B32B 1/02* (2006.01)
*C08G 63/00* (2006.01)
*C08G 63/02* (2006.01)
*B29C 45/00* (2006.01)
*C08G 63/181* (2006.01)
*B65D 1/02* (2006.01)
*C08G 63/183* (2006.01)

(52) U.S. Cl.
CPC ............ *C08G 63/181* (2013.01); *B65D 1/0207* (2013.01); *C08G 63/183* (2013.01)
USPC ...... 428/35.7; 428/36.6; 428/36.92; 528/272; 528/308; 528/308.1; 528/308.6; 264/537

(58) Field of Classification Search
CPC .... C08G 63/02–63/065; C08G 63/12–63/189; B65D 1/02; B65D 1/0207
USPC ............ 428/34.1, 35.7, 36.6, 36.92; 528/271, 528/272, 308, 308.1, 308.6; 264/176.1, 264/219, 537
See application file for complete search history.

(56) References Cited

U.S. PATENT DOCUMENTS

| 4,755,404 A | 7/1988 | Collette |
| 6,342,578 B1 | 1/2002 | Huang |
| 7,087,706 B2 | 8/2006 | Caldwell |
| 7,763,701 B2 * | 7/2010 | Nichols et al. ............. 528/308.3 |

* cited by examiner

*Primary Examiner* — Walter B Aughenbaugh
(74) *Attorney, Agent, or Firm* — Womble Carlyle Sandridge & Rice, LLP

(57) ABSTRACT

Polyester compositions for use in injection stretch blow molded articles having intrinsic viscosities in the range from about 0.65 to about 0.78 dl/g, and carboxyl end group concentrations of about 47 mmole/kg or more are provided. Stretch blow molded articles formed from these polyester compositions and methods to produce these articles are also described.

19 Claims, No Drawings

POLYESTER COMPOSITION FOR IMPROVED STRESS CRACK RESISTANCE IN POLYESTER ARTICLES

RELATED APPLICATIONS

This application claims priority to U.S. Provisional Application No. 61/295,798, which was filed on Jan. 18, 2010 and is herein incorporated by reference in its entirety.

FIELD OF INVENTION

This invention relates to polyester compositions having a balance of intrinsic viscosity and carboxyl end groups such that containers made from the compositions exhibit improved stress crack resistance.

BACKGROUND OF INVENTION

Typical copolyester bottle resins employ polyethylene terephthalate (PET) and a comonomer, either a dicarboxylic acid such as isophthalic acid, or a diol such as 1,4-cyclohexane dimethanol or diethylene glycol. The comonomers are added to decrease the rate of crystallization of PET, in order to obtain clear preforms, which are stretch-blow molded into containers, such as soft drink bottles. If a crystallization retarding agent is not employed, crystallization of the preform occurs resulting in a hazy preform and a hazy container. However, if too much comonomer is used, the physical properties of copolyester resin are significantly weaker than PET resin.

Stress cracking can occur when the polyester container is under stress, such as that caused by carbonation of the beverage in a bottle. The weakest part of the bottle is the base where there is little stretching of the preform resulting in an essentially amorphous base section.

Stress cracking occurs over time, generally in the base of the bottle, causing a bottle under pressure with carbonated liquid to either lose pressure, or in the extreme, burst. Stress cracking can be initiated by the alkaline lubricants used in the bottle filling lines, or by the residues of alkaline cleaning solutions on store shelves.

To minimize caustic stress cracking (CSC) a high molecular weight copolyester is conventionally used; typically a bottle resin having an Intrinsic Viscosity (IV) greater than 0.82 dl/g. This high IV resin can be prepared by first melt polymerizing the copolyester to an IV in the range of about 0.5 to 0.65 dl/g followed by a solid state polymerization to raise the IV to above 0.80 dl/g. Newer polyester polymerization technologies enable an IV of 0.80 dl/g or higher to be achieved in the melt polymerization, without the need for the solid state polymerization process.

U.S. Pat. No. 4,755,404 to Collette is directed to refillable bottles. Based on the results from washing the bottles in a caustic soda solution, he found that all failures (leaks from bottles that had been pressurized with carbonated water) occurred in the unoriented base of the bottle. A bottle designed for refillable use must be recyclable a minimum of five times to be economical. Collette used polyester resins of different IV (0.72, 0.84 and 1.06 dl/g) and observed that the number of cycles to failure was 3, 6 and 7 respectively for bottles made from these different IV resins. This supports that high IV (greater than 0.80 dl/g) resins are required to achieve adequate resistance to caustic stress cracking.

U.S. Pat. No. 6,342,578 to Huang improved the CSC of bottles at high IV by introducing, at the end of polycondensation, one or more of unsubstituted anhydrides such as phthalic or succinic anhydride. The anhydrides reacted with the hydroxyl end groups to form carboxyl end groups (CEG). U.S. Pat. No. 7,087,706 to Caldwell disclosed the use of substituted cyclic anhydrides as other means to increase the CEG of the high IV resin. Both of these patents used high IV (0.80 dl/g or higher) for their examples, but neither taught whether the IV could be reduced at the higher CEG levels while maintaining satisfactory resistance to caustic stress cracking.

SUMMARY OF INVENTION

There is a need in the industry to reduce the IV of bottle resin while maintaining resistance to caustic stress cracking. A lower resin IV would reduce the manufacturing cost associated with either the solid state polymerization process or the melt polymerization process. There is therefore a need to optimize the balance of IV and CEG that is required to meet the specification for CSC and other bottle properties such as dimensional stability, burst strength, and top load.

The invention disclosed herein provides a range of polyester intrinsic viscosity and carboxyl end group concentrations that have been found to give injection stretch blow molded articles improved resistance to caustic stress cracking. In one aspect, polyester composition for use in an injection stretch blow molded article is disclosed, comprising: i) an intrinsic viscosity in the range from about 0.65 to about 0.78 dl/g, and ii) a carboxyl end group concentration of at least about 47 mmole/kg; wherein the intrinsic viscosity and carboxyl end group concentration of the polyester composition are measured after the article has been injection stretch blow molded. In other aspects, stretch blow molded articles of the polyester composition and methods to produce these articles are disclosed.

DETAILED DESCRIPTION OF INVENTION

Disclosed is a polyester composition for use in an injection stretch blow molded article comprising: i) an intrinsic viscosity in the range from about 0.65 to about 0.78 dl/g, and ii) a carboxyl end group concentration of at least about 47 mmole/kg; wherein the intrinsic viscosity and carboxyl end group concentration of the polyester composition are measured after the article has been injection stretch blow molded.

The intrinsic viscosity can be in the range of about 0.65 to about 0.78 dl/g, for example about 0.65 to about 0.75 dl/g, about 0.65 to about 0.70 dl/g, about 0.70 to about 0.78 dl/g, or about 0.70 to about 0.75 dl/g. The carboxyl end group (CEG) concentration can be at least about 47 mmole/kg, for example, at least about 50 mmole/kg and at least about 55 mmole/kg; including from about 47 mmole/kg to about 80 mmole/kg, from about 47 mmole/kg to about 60 mmole/kg, and from about 47 mmole/kg to about 55 mmole/kg.

The polyester can be selected from polyethylene terephthalate, polyethylene naphthalate, polyethylene terephthalate-co-isophthalate, polyethylene naphthalate-co-isophthalate, polyethylene-co-cyclohexane dimethylene terephthalate and mixtures thereof. The polyester can be a copolymer of polyethylene terephtalate having a comonomer content of less than 10 mole % of the polyester.

Polyethylene terephthalate (PET) is conventionally made by reacting either dimethyl terephthalate or terephthalic acid with ethylene glycol, for example, via an esterification reaction, followed by a polycondensation reaction. When making PET, either in a batch or continuous process, the reactions can be driven to near completion, yielding PET having up to 3 weight percent of diethylene glycol and other byproducts. PET is meant to include small amounts of byproducts.

Conventional continuous production of PET comprises reacting terephthalic acid and ethylene glycol at a temperature of approximately 200° to 250° C. forming monomer and water. Because the reaction is reversible, the water is continuously removed, driving the reaction to the production of monomers and some oligomers. Next the monomers and oligomers undergo polycondensation reaction in vacuum conditions at a temperature of about 250° to 290° C. to form polyester having an IV of about 0.4 to 0.6. During the esterification reaction, no catalyst is needed. However, in the polycondensation reaction, a catalyst such as an antimony, germanium, titanium or aluminum compound, optionally with a co-catalyst is necessary.

PET is also made in batch and continuous processes from the reaction of the ester-dimethyl terephthalate and ethylene glycol, at a reaction temperature of approximately 190° to 230° C. forming alcohol (methanol) and monomer. This esterification reaction is reversible and the alcohol must be continuously removed, driving the reaction to the production of monomer and some oligomer. In the reaction of dimethyl terephthalate and ethylene glycol, catalysts such as manganese, zinc, cobalt or other conventional catalyst are employed. Next, the monomer and oligomer undergo a polycondensation reaction at the conditions stated above to form polyester or copolyester having an IV of about 0.4 to 0.6 dl/g if the copolyester is to be solid state polymerized by conventional methods to a higher IV. Making a copolyester of PET and a dicarboxylic acid (to reduce the crystallization rate and improve its barrier properties) merely requires the addition of the acid or its ester equivalent, for example, to also undergo an esterification (or transesterification) reaction. Making a copolyester of PET and a diol merely requires the addition of the diol during esterification (or transesterification).

Resins containing up to 20 wt % of the dicarboxylic acid are useful in forming bottles or jar containers. Suitable diacids can be aliphatic, alicyclic, or aromatic dicarboxylic acids such as isophthalic acid, 1,4-cyclohexanedicarboxylic acid; 1,3-cyclohexanedicarboxylic acid, succinic acid, glutaric acid, adipic acid, sebacic acid, 1,12-dodecanedioic acid; 2,6-naphthalenedicarboxylic acid, bibenzoic acid, oxalic acid, malonic acid, pimelic acid, suberic acid, azelaic acid, maleic acid, fumaric acid, phthalic acid, hemimellitic acid, trimellitic acid, trimesic acid, or mixtures of these and their equivalents. It is often suitable to use a functional acid derivative equivalent such as dimethyl, diethyl, or dipropyl ester of the dicarboxylic acid. Bottle resin, including the present invention, typically contains 1.5 to 2.5 wt. %, based on the weight of the resin, of isophthalic acid as the crystallization retarder additive.

Alternatively, polyester resins can optionally be modified by up to 20 wt % of one or more different diols than ethylene glycol. Such additional diols include cycloaliphatic diols for example having 6 to 20 carbon atoms or aliphatic diols preferably having 3 to 20 carbon atoms. Examples of such diols to be included with ethylene glycol are: diethylene glycol, triethylene glycol, 1,2-cyclohexanedimethanol, 1,3-cyclohexanedimethanol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4 hydroxypropoxyphenyl)-propane.

Another embodiment of the present invention is a modified polyester made by reacting at least 85 mol-% terephthalate from either terephthalic acid or dimethyl-terephthalate with any of the above comonomers.

In addition to polyester made from terephthalic acid (or dimethyl terephthalate) and ethylene glycol, or a modified polyester as stated above, the present invention also includes the use of 100% of an aromatic diacid such as 2,6-naphthalene dicarboxylic acid or bibenzoic acid, or their diesters, and a modified polyester made by reacting at least 85 mol-% of the dicarboxylate from these aromatic diacids/diesters with any of the above comonomers.

The CEG level of the resin can be increased by increasing the mole ratio of purified terephthalic acid (PTA) to ethylene glycol (EG) in a direct esterification process, or by the addition of PTA after the transesterification reaction in a DMT process. Alternatively cyclic anhydrides can be added at the end of the melt polymerization.

Another aspect includes stretch blow molded articles of the disclosed polyester compositions. The article can be a container or a bottle for carbonated beverages. Bottles with a 2-liter interior volume made with the disclosed polyester compositions exhibit a burst pressure of greater than about 1000 kPa, including greater than about 1100 kPa, and from about 1000 kPa to about 1100 kPa. Bottles with a 0.6-liter interior volume made with the disclosed polyester compositions exhibit a burst pressure of greater than about 1200 kPa, including greater than about 1400 kPa, greater than about 1600 kPa, from about 1200 kPa to about 1600 kPa, and from about 1400 kPa to about 1600 kPa. Furthermore, the bottles, either 2-liter or 0.6-liter, exhibit a CSC time to failure of 180 minutes or more.

A further aspect is a method for improving resistance to caustic stress cracking in injection stretch blown articles comprising: i) preparing a polyester resin; ii) melting the resin; and iii) injection stretch blow molding the resin into the article, wherein the polyester resin in the article has an intrinsic viscosity in the range of 0.65 to 0.78 dl/g and a carboxyl end group of greater than about 47 mmole/kg. The article can be a container or a bottle for carbonated beverages, including bottles having a pentaloid base.

When making bottle preforms and plastic bottles from the preforms, it is often desired to produce the cleanest, clearest polymer. Accordingly, the fewer additives employed, the clearer the polymer produced. On the other hand, it is sometimes desirable to make a colored plastic bottle or bottles with other desired characteristics, and thus the use of a variety of conventionally known additives is also within the scope of the present invention. Accordingly, various pigments, dyes, fillers, branching agents, and other typical agents can be added to the polymer generally during or near the end of the polycondensation reaction. Any conventional system can be employed for the introduction of these additives to achieve the desired result.

Test Procedures

1. Carboxyl End Group (CEG)

The CEG value of a polymer is determined by dissolving a sample of the polymer in reagent grade benzyl alcohol and titrating to the purple end point of phenol red indicator with 0.03 N sodium hydroxide/benzyl alcohol solution. The results are reported in millimole sodium hydroxide per kilogram (mmole/kg) of the sample.

2. Diethylene Glycol (DEG)

The DEG content of the polymer is determined by hydrolyzing the polymer with an aqueous solution of ammonium hydroxide in a sealed reaction vessel at 220±0.5° C. for approximately two hours. The liquid portion of the hydrolyzed product is then analyzed by gas chromatography. The gas chromatography apparatus is a FID Detector (HP5890, HP7673A) from Hewlett Packard. The ammonium hydroxide is 28 to 30% by weight ammonium hydroxide from Fisher Scientific and is reagent grade. The DEG content is reported as a weight % based on the weight of the polymer. The IV (dl/g) of the polymer is determined according to ASTM D4603-96 (60/40 by weight phenol/1,1,2,2-tetrachloroethane solvent) at 30° C.

3. Caustic Stress Cracking

The resistance of a bottle to caustic stress cracking is determined at an accelerated test using sodium hydroxide to induce stress cracking. Twenty-five bottles are used as a set. The bottles are filled with water at 22° C. to a target net content (0.6 liter bottles would contain 0.6 liter of water). Each bottle is pressurized with compressed air to an equivalent internal pressure of 531 kPa (77 psi). Five minutes after pressurization, each bottle is placed in individual pockets containing a 0.1 percent sodium hydroxide solution at 22° C. The solution covers the base of the bottle up to the top of the base of the bottle. The time for failure of each bottle is recorded. Failure is defined as a burst or slow leak as evidenced by a drop in the level of water in the bottle. The test is completed after four hours. Results are reported as the average time to fail. The specification for pentaloid base bottles is an average time to failure of ≥180 minutes.

4. Thermal Stability of the Bottles 24 bottles are carbonated ≥24 hours after blow molding to a carbonation level of 4.3±0.1 volume of carbon dioxide/volume of bottle and initial measurements were taken. The height and fill line were measured on each bottle. The diameter of the contour bottles at the panel, pinch and heel were averaged from measurements every 45° around each of these sections. The bottles were then conditioned overnight at 72° F. and 50% RH, and dimension measurements were again recorded after 24 hours at 100° F. and 100% RH. The bottles were kept overnight at 72° F. and 50% RH prior to recording the final dimensions. The % change in dimensions is recorded.

5. Top Load and Burst Pressure

The bottle is crushed at a rate of 25 mm/min, and the highest load that the bottle withstands is recorded as the top load. The bottle is connected to a high pressure of air, and the pressure at which it bursts is recorded as the burst pressure.

6. Preform and Bottle Production

The resin of the present invention is heated and injection molded into preforms. The weight of the preform depends on the size of bottle (26.8 g for 0.6 liter and 55.3 for 2 liter). The preform is then heated to about 100 to 120° C. and stretch blow-molded into a bottle at a stretch ratio of about 12.5. The stretch ratio is the stretch in the radial direction times the stretch in the length (axial) direction. Thus if a preform is blown into a bottle, it may be stretched about three times its length and stretched about four times its diameter giving a stretch ratio of twelve (3×4). Testing for stress cracking should be measured with bottles having a base of about the same thickness (i.e., the same amount of resin) to give comparable results. The preforms tested in the examples for the 0.6 liter bottles have from 5.3 to 5.4 grams of resin in the pentaloid base, and 11.3 to 11.5 for the 2 liter bottles. Stress cracking typically occurs in the base of the bottle.

EXAMPLES

Example 1

A pilot continuous reactor consisting of a primary esterifier, secondary esterifier, low polymerizer and high polymerizer was used to prepare resins from PTA and EG, together with isophthalic acid, having various IV and CEG levels. Antimony trioxide (250 ppm Sb) was used as the polycondensation catalyst. A glycol solution of phosphoric acid (12 ppm P) was added in the transfer line between the primary and secondary esterifier. The high polymerizer vacuum level and the PTA/EG mole ratio was changed to give the target polymer IV and CEG. The IV of the melt polymerized resin was chosen such that the solid state polymerization times for all the samples were about the same. The melt polymerized pellets were solid state polymerized at 200° C. in a vacuum tumble dryer to different IV levels. After drying, 0.6 liter contour bottles with a pentaloid base were injection stretched molded.

The properties of the amorphous melt phase polymerized polymer, the Solid State Polymerized (SSP) and Bottle IV and CEG properties are set forth in Table 1.

TABLE 1

| | | | Amorphous | | SSP | Bottle | |
| --- | --- | --- | --- | --- | --- | --- | --- |
| Run | IPA, wt. % | DEG, wt. % | CEG, mmole/kg | IV, dl/g | IV, dl/g | IV, dl/g | CEG, mmole/kg |
| 1 | 2.0 | 1.5 | 19 | 0.60 | 0.859 | 0.817 | 14 |
| 2 | 2.0 | 1.6 | 52 | 0.60 | 0.840 | 0.816 | 37 |
| 3 | 2.0 | 1.5 | 36 | 0.55 | 0.801 | 0.777 | 23 |
| 4 | 2.0 | 1.6 | 52 | 0.51 | 0.758 | 0.744 | 35 |
| 5 | 2.2 | 1.6 | 52 | 0.50 | 0.742 | 0.737 | 43 |
| 6 | 2.2 | 1.6 | 37 | 0.50 | 0.744 | 0.714 | 25 |
| 7 | 2.0 | 1.5 | 21 | 0.50 | 0.733 | 0.700 | 16 |

The bottle physical properties are set forth in Table 2.

TABLE 2

| | | CSC | | Thermal Stability | | | | |
| --- | --- | --- | --- | --- | --- | --- | --- | --- |
| Run | Base wt. g. | Time to failure, min. | % Change in height | Change in fill line, cm | % dia. change, label | % dia. Change, pinch/heel ratio | Burst Pressure kPa | Top Load kg |
| 1 | 5.4 | 120 | 1.92 | 1.69 | 0.81 | 88.9 | 1771 | 22.5 |
| 2 | 5.4 | 168 | 1.94 | 1.80 | 0.85 | 89.0 | 1764 | 22.5 |
| 3 | 5.4 | 165 | 1.91 | 1.68 | 0.78 | 88.7 | 1833 | 22.7 |
| 4 | 5.5 | 173 | 1.96 | 1.80 | 0.82 | 88.9 | 1709 | 22.8 |
| 5 | 5.4 | 168 | 2.07 | 1.85 | 0.88 | 89.1 | 1688 | 21.2 |

TABLE 2-continued

| Run | Base wt. g. | CSC Time to failure, min. | % Change in height | Change in fill line, cm | % dia. change, label | % dia. Change, pinch/heel ratio | Burst Pressure kPa | Top Load kg |
|---|---|---|---|---|---|---|---|---|
| 6 | 5.4 | 77 | 2.19 | 1.90 | 0.95 | 89.2 | 1667 | 22.2 |
| 7 | 5.5 | 44 | 2.06 | 1.82 | 0.84 | 89.4 | 1619 | 21.8 |

The specifications for the 0.6 liter bottle properties are:

| CSC, average time to failure | ≥180 min. |
|---|---|
| % change in height | ≤3% |
| % change in fill line | ≤2.4% |
| % diameter change, label section | ≤2.5% |
| % diameter change, pinch/heel ratio | 88-90% |
| Burst pressure | ≥1200 kPa |
| Top load | ≥15 kg |

With respect to the thermal stability, burst pressure and top load, all the bottles were well above the minimum specifications for this bottle design.

Example 2

Commercial bottle resins, manufactured by either a PTA process or a DMT process, were dried and were injection stretch blow molded into 2 liter contour pentaloid base bottles. The properties of the resins are set forth in Table 3.

TABLE 3

| | SSP | | | Bottle | |
|---|---|---|---|---|---|
| Run | IPA, wt. % | DEG, wt. % | IV, dl/g | IV, dl/g | CEG, mmol/kg |
| 8 | 2.4 | 1.5 | 0.751 | 0.725 | 28 |
| 9 | 2.0 | 1.3 | 0.753 | 0.727 | 28 |
| 10 | 2.4 | 1.4 | 0.820 | 0.781 | 13 |
| 11 | 2.0 | 1.5 | 0.836 | 0.794 | 20 |
| 12 | 2.3 | 1.7 | 0.840 | 0.794 | 23 |
| 13 | 24 | 1.6 | 0.828 | 0.802 | 25 |
| 14 | 2.0 | 1.5 | 0.852 | 0.816 | 23 |
| 15 | 2.4 | 1.7 | 0.854 | 0.832 | 23 |
| 16 | 2.4 | 1.6 | 0.873 | 0.855 | 29 |
| 17 | 2.4 | 1.6 | 0.887 | 0.857 | 43 |

The bottle physical properties are set forth in Table 4.

TABLE 4

| | | | | Thermal Stability | | |
|---|---|---|---|---|---|---|
| Run | Base wt. g. | CSC Time to failure, min. | % Change in height | Change in fill line, cm | % dia. change, label | % dia. Change, pinch/heel ratio | Burst Pressure kPa |
| 8 | 11.5 | 105 | 1.34 | 3.36 | 1.94 | 90.4 | 1192 |
| 9 | 11.4 | 106 | 1.39 | 3.34 | 1.95 | 90.2 | 1027 |
| 10 | 11.5 | 86 | 1.39 | 3.39 | 1.82 | 90.2 | 1137 |
| 11 | 11.6 | 116 | 1.31 | 3.40 | 1.94 | 91.1 | 1123 |
| 12 | 11.5 | 126 | 1.35 | 3.34 | 1.90 | 90.5 | 1130 |
| 13 | 11.4 | 134 | 1.36 | 3.62 | 2.01 | 90.3 | 1116 |
| 14 | 11.5 | 137 | 1.35 | 3.30 | 1.85 | 90.9 | 1164 |
| 15 | 11.6 | 149 | 1.35 | 3.57 | 2.03 | 90.8 | 1102 |
| 16 | 11.6 | 171 | 1.36 | 3.41 | 1.87 | 90.4 | 1116 |
| 17 | 11.5 | 201 | 1.41 | 3.39 | 1.94 | 90.6 | 1137 |

The specifications for a 2 liter pentaloid contour bottle are:

| CSC, average time to failure | ≥180 min. |
|---|---|
| % change in height | 10 ≤4 cm |
| % change in fill line | ≤2.4% |
| % diameter change, label section | ≤3% |
| % diameter change, pinch/heel ratio | 90-92% |
| Burst pressure | ≥1000 kPa |

With respect to the thermal stability, burst pressure and top load, all the bottles were well above the minimum specifications for this bottle design.

Example 3

Inventive

A multivariate analysis of the CSC time to failure as a function of the preform IV and CEG results from Examples 1 and 2 gave a model capturing 94% of the variance, by including two interaction terms, $IV^2$ and $IV \times CEG$. This model was then used to calculate the minimum CEG required at a given IV to meet the minimum CSC time of failure of 180 min. The results of this calculation are set forth in Table 5.

TABLE 5

| IV | CEG |
|---|---|
| 0.600 | 47.5 |
| 0.625 | 47.5 |
| 0.650 | 47.4 |
| 0.675 | 47.2 |
| 0.700 | 46.9 |
| 0.725 | 46.3 |
| 0.750 | 45.4 |
| 0.775 | 44.0 |
| 0.800 | 42.0 |
| 0.825 | 38.9 |

Below a preform IV of 0.70 dl/g, a CEG of about 47 mmol/kg will provide a bottle that will meet the CSC performance requirement. Between a preform IV of 0.8 and 0.70 dl/g, a lower CEG in the range of about 42 to about 46 mmole/kg is required. As shown above in Tables 1 and 3, the preform IV is about 3%-6% higher than the molded article CV. Thus, to meet the minimum failure time in an industry standard CSC test of 180 min., the IV (dl/g) of the molded article must be between about 0.65 and about 0.78, and CEG (mmole/kg) of at least about 0.47. That is, the IV (dl/g) and CEG (mmole/kg) of the molded article satisfy this relationship:

$0.65 \leq IV \leq 0.78$ dl/g, and CEG≥47 mmole/kg

While the invention has been described in conjunction with specific aspects thereof, it is evident that the many alternatives, modifications, and variations will be apparent to those skilled in the art in light of the foregoing description. Accordingly, the invention is intended to embrace all such alternatives, modifications and variations as fall within the spirit and scope of the claims.

What is claimed is:

1. A polyester composition for use in an injection stretch blow molded article comprising: i) an intrinsic viscosity in the range from about 0.65 to about 0.78 dl/g, and ii) a carboxyl end group concentration of at least about 47 mmole/kg; wherein the intrinsic viscosity and the carboxyl end group concentration of the polyester composition are measured after the article has been injection stretch blow molded; wherein the composition is adapted to provide the injection stretch blow molded article with a CSC time to failure of 180 minutes or more; and wherein the composition comprises no cyclic anhydrides.

2. The composition of claim 1 wherein said intrinsic viscosity is in the range of about 0.65 to about 0.75 dl/g.

3. The composition of claim 1 wherein said intrinsic viscosity is in the range of about 0.65 to about 0.70 dl/g.

4. The composition of claim 1 wherein said intrinsic viscosity is in the range of about 0.70 to about 0.78 dl/g.

5. The composition of claim 1 wherein said intrinsic viscosity is in the range of about 0.70 to about 0.75 dl/g.

6. The composition of claim 1 wherein said carboxyl end group concentration is at least about 50 mmole/kg.

7. The composition of claim 1 wherein said carboxyl end group concentration is at least about 55 mmole/kg.

8. The composition of claim 1 wherein said polyester is selected from the group consisting of polyethylene terephthalate, polyethylene naphthalate, polyethylene terephthalate-co-isophthalate, polyethylene naphthalate-co-isophthalate, polyethylene-co-cyclohexane dimethylene terephthalate and mixtures thereof.

9. The composition of claim 1 wherein said polyester is a copolymer of polyethylene terephthalate having a comonomer content of less than 10 mole % of the polyester.

10. An injection stretch blow molded article comprising the composition of claim 1.

11. The article of claim 10 wherein said article comprises a container.

12. The article of claim 10 wherein said article comprises a bottle for carbonated beverages having a pentaloid base.

13. The article of claim 12, wherein the beverage bottle has an interior volume of about 0.6 liters and a burst pressure of greater than about 1200 kPa.

14. The article of claim 12, wherein the beverage bottle has an interior volume of about 2 liters and a burst pressure of greater than about 1000 kPa.

15. The article of claim 12, wherein the beverage bottle has a CSC time to failure of 180 minutes or more.

16. A method for improving resistance to caustic stress cracking in an injection stretch blown article comprising: i) preparing a polyester resin; ii) melting the resin; and iii) injection stretch blow molding the resin into the article, wherein the polyester resin in the article has an intrinsic viscosity in the range of 0.65 to 0.78 dl/g and a carboxyl end group concentration of greater than about 47 mmole/kg; and wherein the polyester resin in the article comprises no cyclic anhydrides.

17. The method of claim 16 wherein the article is a container.

18. The method of claim 16 wherein the article is a bottle for carbonated beverages having a pentaloid base, 19. The composition of claim 1, wherein the minimum CEG required at a given IV to meet the minimum CSC time of failure of 180 minutes is defined by the following table:

| Iv | CEG |
|---|---|
| 0.650 | 47.4 |
| 0.675 | 47.2 |
| 0.700 | 46.9. |

* * * * *